(12) United States Patent
Vinogradov et al.

(10) Patent No.: US 8,701,999 B2
(45) Date of Patent: Apr. 22, 2014

(54) METHOD AND APPARATUS FOR READING OPTICAL INDICIA

(75) Inventors: Igor R. Vinogradov, New York, NY (US); Edward Barkan, Miller Place, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 908 days.

(21) Appl. No.: 12/114,334

(22) Filed: May 2, 2008

(65) Prior Publication Data

US 2009/0272804 A1 Nov. 5, 2009

(51) Int. Cl.
*G06K 7/10* (2006.01)

(52) U.S. Cl.
USPC ..................... 235/455; 235/462.25

(58) Field of Classification Search
USPC ............. 235/438, 439, 454, 455, 462.01, 235/462.41–49; 358/401, 406, 443
See application file for complete search history.

(56) References Cited

U.S. PATENT DOCUMENTS

| | | | | |
|---|---|---|---|---|
| 5,550,362 A | * | 8/1996 | Sherman | 235/455 |
| 6,223,988 B1 | * | 5/2001 | Batterman et al. | 235/472.01 |
| 6,466,337 B1 | * | 10/2002 | Suhr et al. | 358/446 |
| 6,729,546 B2 | * | 5/2004 | Roustaei | 235/462.45 |

* cited by examiner

*Primary Examiner* — Thien M Le
(74) *Attorney, Agent, or Firm* — Nong-Qiang Fan

(57) ABSTRACT

A method and apparatus for reading optical indicia. The method includes generating calibration light, and measuring an intensity of the calibration light reflected into a detector system. The method also includes determining an optimum exposure level for the imaging system based on the measured intensity of the calibration light reflected into the detector system, and generating an illumination light with an illumination system. In addition, the method includes capturing an image of the optical indicia with the imaging system subjecting to the optimum exposure level.

28 Claims, 4 Drawing Sheets

METHOD AND APPARATUS FOR READING OPTICAL INDICIA

FIELD OF THE DISCLOSURE

The present disclosure relates generally to the reading of optical indicia, such as barcodes.

BACKGROUND

Various electro-optical systems have been developed for reading optical indicia, such as barcodes. A barcode is a coded pattern of graphical indicia comprised of a series of bars and spaces of varying widths, the bars and spaces having differing light reflecting characteristics. Some of the more popular barcode symbologies include: Universal Product Code (UPC), typically used in retail stores sales; Data Matrix, typically used for labeling small electronic products; Code 39, primarily used in inventory tracking; and Postnet, which is used for encoding zip codes for U.S. mail. Barcodes may be one dimensional (1D), i.e., a single row of graphical indicia such as a UPC barcode or two dimensional (2D), i.e., multiple rows of graphical indicia comprising a single barcode, such as Data Matrix which comprising multiple rows and columns of black and white square modules arranged in a square or rectangular pattern.

Systems that read barcodes (i.e., barcode readers) electro-optically transform the graphic indicia into electrical signals, which are decoded into alphanumerical characters that are intended to be descriptive of the article or some characteristic thereof. The characters are then typically represented in digital form and utilized as an input to a data processing system for various end-user applications such as point-of-sale processing, inventory control and the like.

Barcode readers that read and decode barcodes employing imaging systems are typically referred to as imaging-based barcode readers or barcode scanners. Imaging systems include charge coupled device (CCD) arrays, complementary metal oxide semiconductor (CMOS) arrays, or other imaging sensor arrays having a plurality of photosensitive elements (e.g., photo-sensors) defining image pixels. An illumination system including light emitting diodes (LEDs) or other light source directs illumination light toward a target object, e.g., a target barcode. Light reflected from the target barcode is focused through a system of one or more lens of the imaging system onto the sensor array. Periodically, the pixels of the sensor array are read out to generate signal representative of a captured image frame, which can be processed by the decoding circuitry of the imaging system to decode the imaged barcode.

When an imaging scanner is used to read barcodes, it usually operates in a broad variety of ambient light conditions including bright sun or dark areas where an additional illumination system is needed. It is important to set properly the exposure time and the gain of the sensor to achieve acceptable image quality. If the exposure is too short, the image will appear dark. If the exposure is too long, the image will be for the most part over saturated. Usually it requires acquiring a few images before the optimum setting for the exposure is found.

Under low ambient light conditions, an illumination system can be used. Unfortunately the brightness of the image depends on the distance to the acquired object and its reflectivity, therefore it still may be required to acquire a few images before the optimum setting for the exposure is found.

For improving the life expectancy of the illumination system, it will be advantageous to avoid energizing the illumination system at the full brightness before the optimum setting for the exposure is found.

SUMMARY

In one aspect, the invention is directed to a method of reading optical indicia with an imaging system. The method includes generating calibration light when a measured intensity of ambient light is lower than a predetermined value. The method includes measuring an intensity of the calibration light reflected into a detector system. The method includes determining an optimum exposure level for the imaging system based on the measured intensity of the calibration light reflected into the detector system. The method includes generating an illumination light with an illumination system. The method includes capturing an image of the optical indicia with the imaging system subjecting to the optimum exposure level.

Implementations of the invention can include one or more of the following advantages. The method and apparatus disclosed herein may improve the life expectancy of the illumination system in an imaging scanner. These and other advantages of the present invention will become apparent to those skilled in the art upon a reading of the following specification of the invention and a study of the several figures of the drawings.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
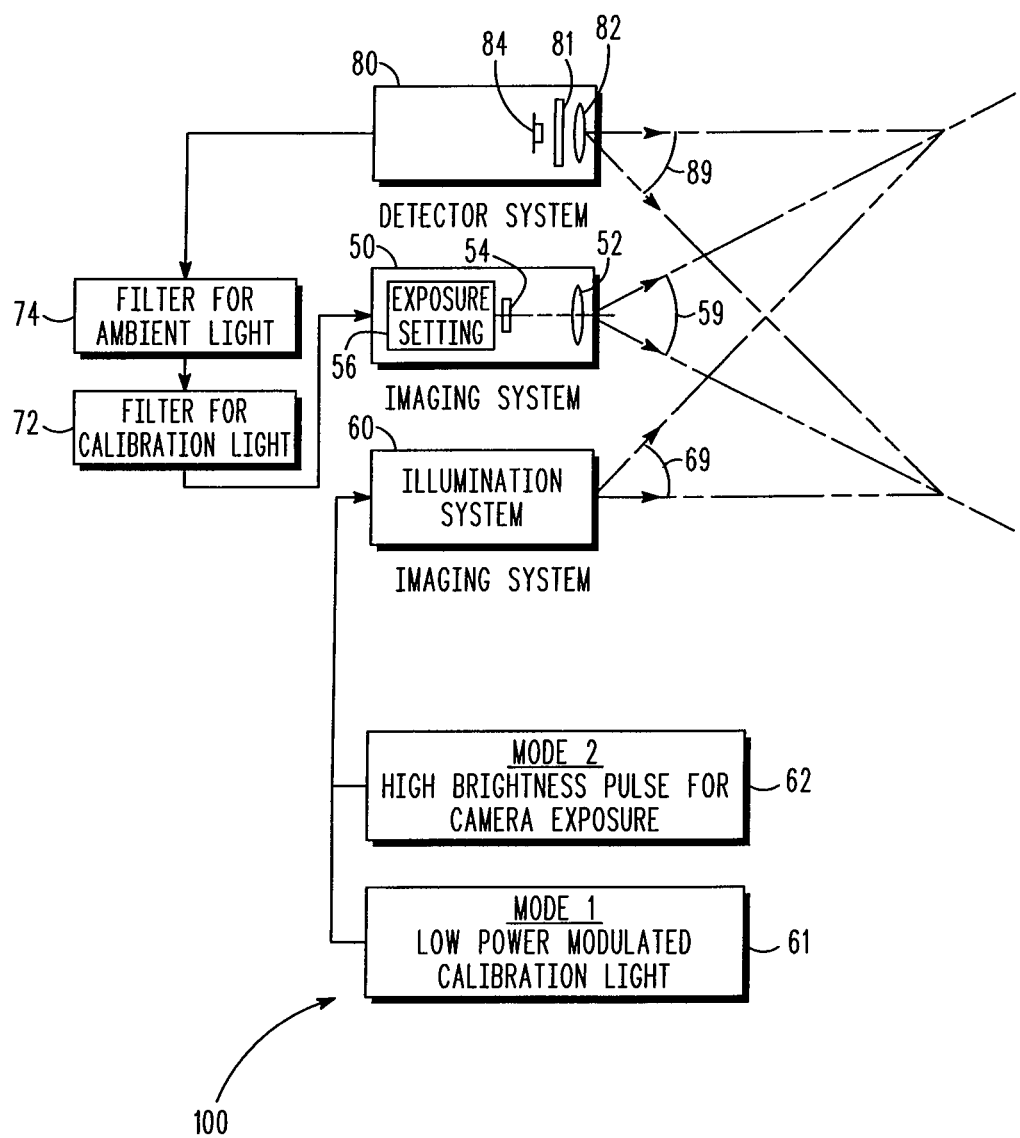
FIG. 1 is a schematic of an imaging scanner 100 for reading optical indicia in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 is a schematic of an imaging scanner 100 for reading optical indicia in accordance with some embodiments. The imaging scanner 100 includes an illumination system 60, a detector system 80, and an imaging system 50. The illumination system 60 has at lest two operation modes. In a first operation mode 61, the illumination system 60 generates a calibration light. In a second operation mode 62, the illumination system generates an illumination light. The detector system 80 is operable to measure intensity of the calibration light reflected into the detector system. The imaging system 50 includes an imaging sensor 54 and has a first lens system 52 defining a first field of view 59. The imaging sensor 54 can be CCD or CMOS sensor arrays. The imaging system 50 is configured to capture an image of the optical indicia with an optimum exposure level that is determined based on the measured intensity of the calibration light reflected into the detector system 80. In FIG. 1, the detector system 80 includes a second lens system 82 defining a second field of view 89 that substantially overlaps with the first field of view 59 of the imaging system 50. In one implementation, the detector system 80 can also include an optical filter 81 configured to filter light detected by the detector. In one implementation, the optical filter 81 has photo sensitivity spectrum designed to match the photo sensitivity spectrum of the imaging sensor 54.

In one implementation, the illumination system 60 in the first operation mode generates a calibration light modulated at a modulation frequency. The modulation frequency can be selected to be different from some typical frequencies of flickering fluorescent light such as 50-60 Hz and 50 KHz. For example, the modulation frequency can be selected to be between 60 Hz and 50 KHz. The modulation frequency can also be selected to be within other frequency ranges. The detector system 80 includes a photodetector 84 that has an output coupled to an electrical band pass filter (not shown in the figure). The band pass filter has a pass band including the modulation frequency. The illumination system 60 in the second operation mode generates a pulsed illumination light. In FIG. 1, the detector system 80 is coupled to the imaging system 50 through a filter 74 for the ambient light and a filter 72 for the calibration light. In FIG. 1, the illumination system 60 is used for generating both the calibration light and the illumination light for capturing images with the imaging system. As an alternative, the calibration light can be generated with a dedicated LED, or some other calibration illumination system which is different from the illumination system 60. For example, the calibration light may be generated with the targeting illumination system.

The imaging scanner 100 can be a portable scanner or stationary scanner. The illumination system 60, the detector system 80, and the imaging system 50 can be installed in a scan engine; they can also be installed directly in the portable scanner or the stationary scanner.

Figure 2:
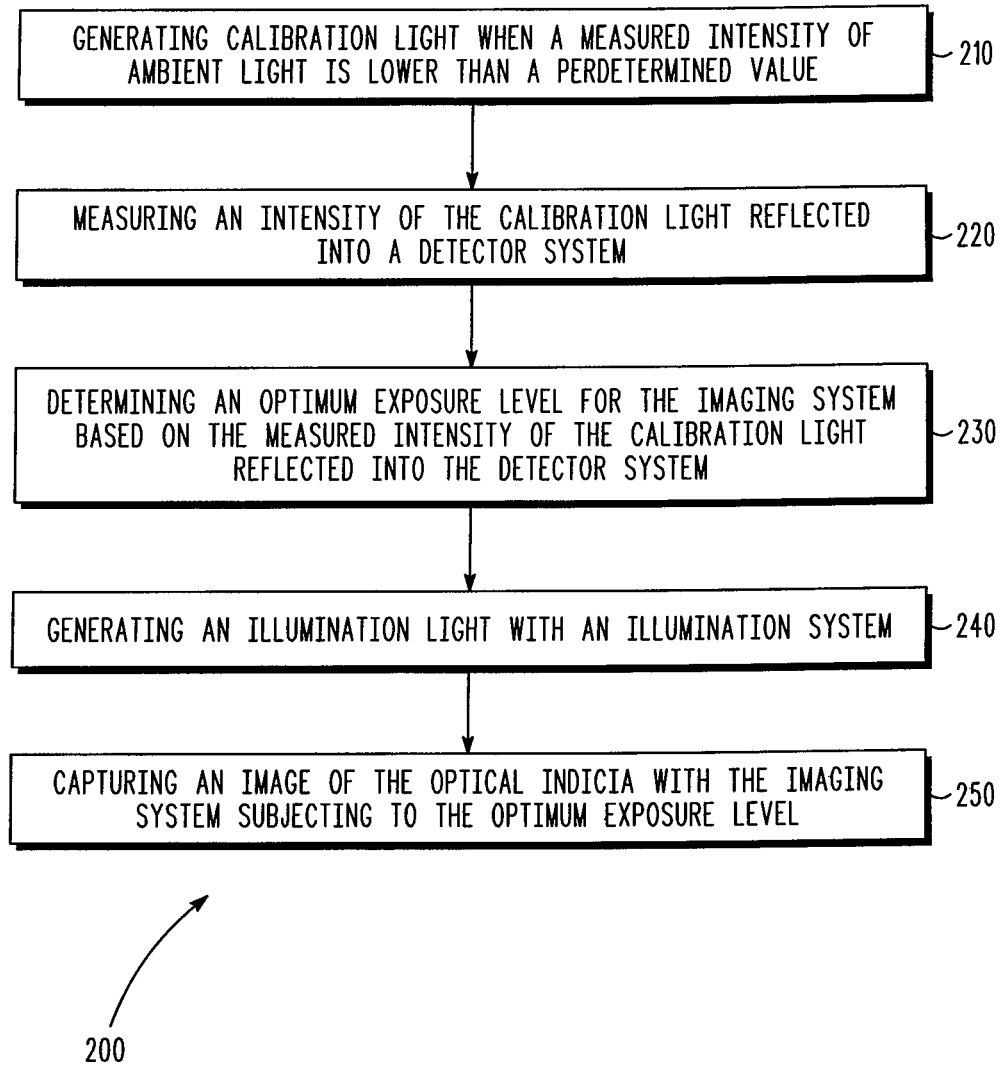
FIG. 2 is a flowchart of a method 200 of reading optical indicia in accordance with some embodiments.

FIG. 2 is a flowchart of a method 200 of reading optical indicia in accordance with some embodiments. The method 200 of capturing an image includes for operations 210, 220, 230, 240, and 250.

Operation 210 includes generating calibration light when a measured intensity of ambient light is lower than a predetermined value. Operation 220 includes measuring an intensity of the calibration light reflected into a detector system. Operation 230 includes determining an optimum exposure level for an imaging system based on the measured intensity of the calibration light reflected into the detector system. Operation 240 includes generating an illumination light with an illumination system. Operation 250 includes capturing an image of the optical indicia with the imaging system subjecting to the optimum exposure level.

As an example, when the method 200 of capturing an image is practiced with the imaging scanner 100 as shown in FIG. 1, the ambient light can be measured with the detector system 80. If the measured ambient light is lower than a predetermined value, generally, some illumination light needs to be applied to the object (e.g., a barcode) placed in front of the imaging system 50. Before turning on the illumination light to capture an image of this object (e.g., a barcode), a calibration light can be generated with the illumination system 60 for determining an optimum exposure level for the imaging system 50. After this optimum exposure level is determined based on the measured intensity of the calibration light reflected into the detector system 80, the illumination light can be turned on with the illumination system 60 and the image can be captured with the imaging system 50. The optimum exposure level can be achieved with an exposure setting control circuit 56 in the imaging system 50.

In one implementation, the calibration light can be modulated at a modulation frequency. When this calibration light is detected by the photodetector 84 in the detector system 80, the electrical signal at the out put of the photodetector generated by the calibration light may also be modulated at the modulation frequency. This electrical signal due to the calibration light generally can be distinguished from the signal at the output of the photodetector 84 generated by the ambient light. It is possible to avoid some of the special circumstances in which the calibration light can be confused with the ambient light. For example, the modulation frequency can be selected to be different from the frequency of some artificial light, such as, the light generated by florescent tubes. For detecting electrical signal due to the calibration light, the electrical signal at the output of the photodetector can pass through an electrical band pass filter having a pass band including the modulation frequency. This band pass filter can be part of the filter 72 for the calibration light as shown in FIG. 1. To improve further the immunity of the calibration system to the ambient light, an optical band pass filter can be applied to filter out the ambient light and improve the signal to noise ratio.

In one implementation, operation 230 includes determining an optimum exposure time, and operation 240 includes generate an illumination light with an illumination system during the determined optimum exposure time. In an alternative embodiment of the method 200 of reading optical indicia, operation 210 includes generating calibration light regardless the level of ambient light.

The method 200 as shown in FIG. 2 and the imaging scanner 100 as shown in FIG. 1 may have the following advantages. For example, low intensity calibration light can be used to determined the optimum exposure level for the imaging system 50 before full brightness illumination light is turned on to enable the image be captured by the imaging system 50. In one implementation, for determining the optimum exposure level for the imaging system 50, it is possible to use modulated calibration light that has intensity less than 10% of the intensity of the full brightness illumination light. Such method may improve the life expectancy of the illumination system. In addition, when an illumination light is generated during the determined optimum exposure time, the life expectancy of the illumination system can also be improved.

Figure 3:
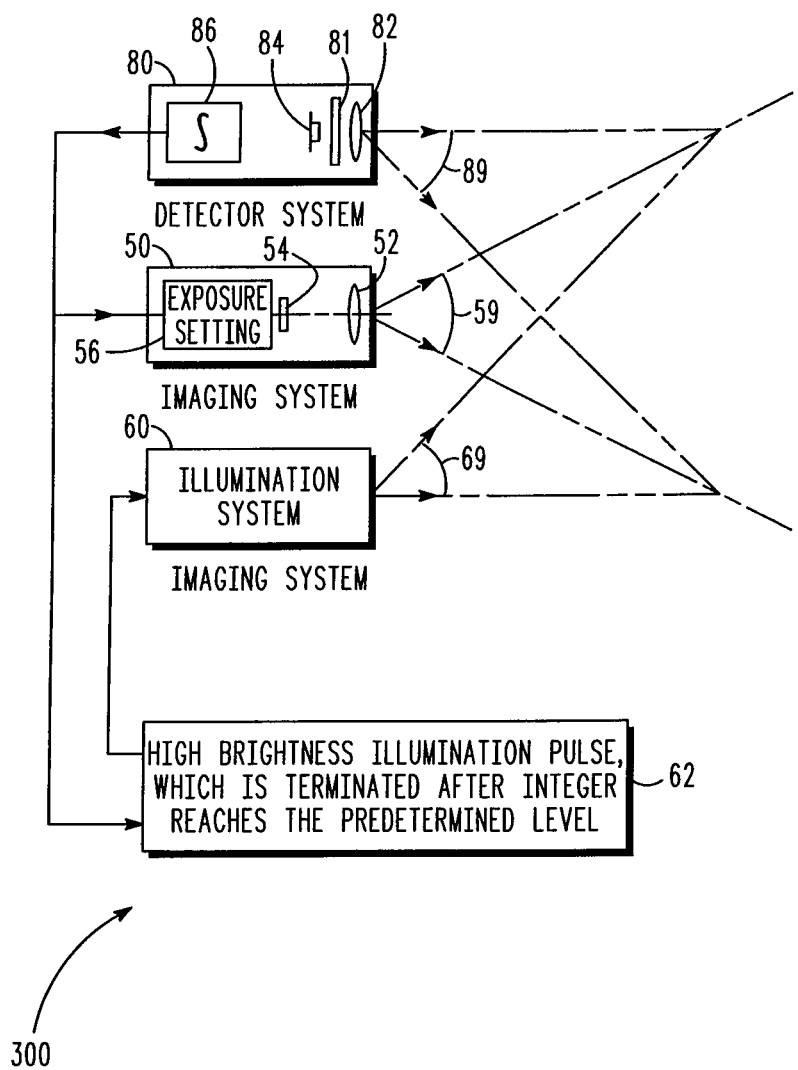
FIG. 3 is a schematic of another imaging scanner 300 for reading optical indicia in accordance with some embodiments.

FIG. 3 is a schematic of another imaging scanner 300 for reading optical indicia in accordance with some embodiments. The imaging scanner 300 includes an illumination system 60, an imaging system 50, and a detector system 80. The illumination system 60 is operable to generate a pulsed illumination light. The imaging system includes an imaging sensor 54 and having a first lens system 52 defining a first field of view 59. The detector system 80 includes a photodetector 84 and an integrator 86 that receives an electrical signal from an output of the photodetector 84. The imaging system 50 is operable to initiate capturing an image of the optical indicia and operable to end capturing the image after the integration of the electrical signal from the output of the photodetector 84 reaches a predetermined value. In one implementation, the integrator 86 is also coupled to the illumination system 60 to enable the illumination light be terminated after the integration of the electrical signal from the output of the photodetector reaches a predetermined value.

In one implementation, the detector system 80 includes a second lens system 82 defining a second field of view 89 substantially overlap with the first field of view 59 of the imaging system. The detector system 80 can also include an optical filter 81 configured to filter light detected by the detector. In one implementation, the optical filter 81 has photo sensitivity spectrum designed to match the photo sensitivity spectrum of the imaging sensor 54.

Figure 4:
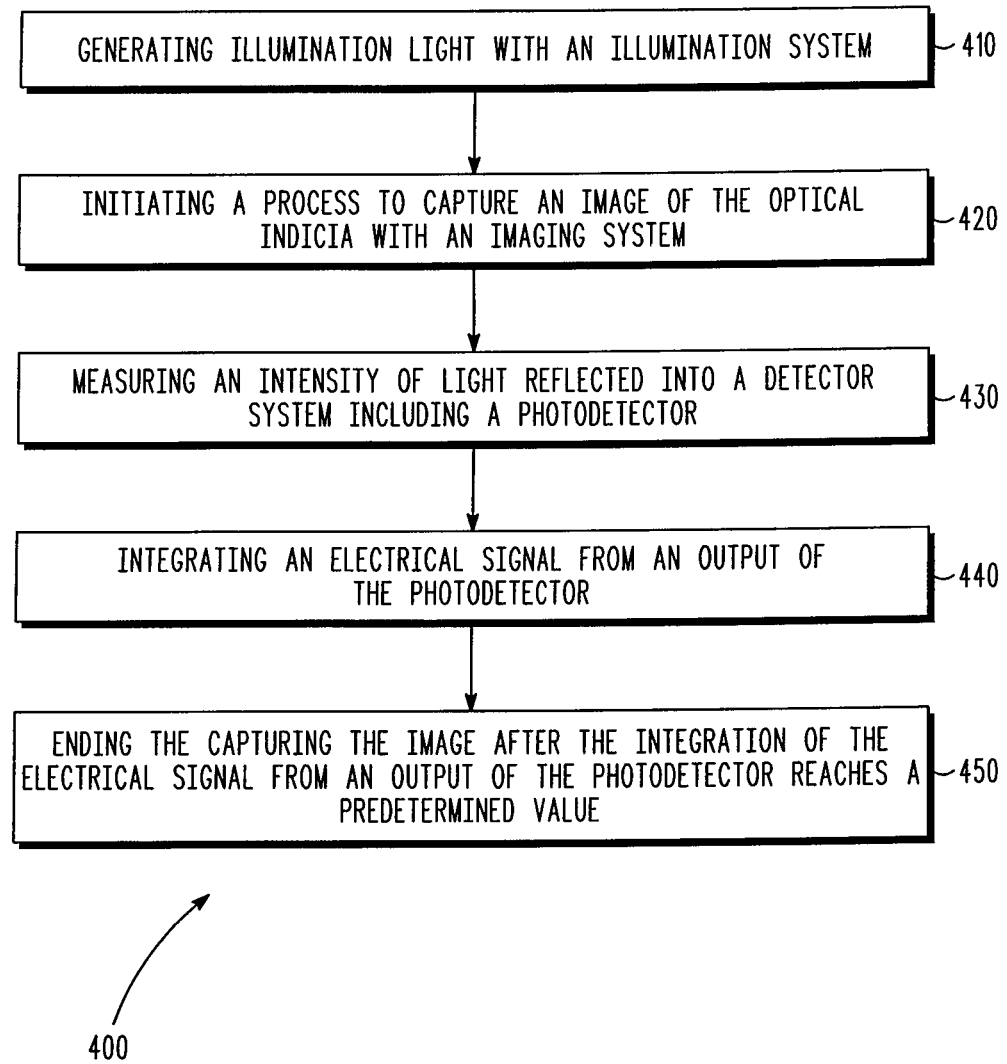
FIG. 4 is a flowchart of a method 400 of reading optical indicia with the imaging scanner in FIG. 3 or other imaging scanner in accordance with some embodiments.

FIG. 4 is a flowchart of a method 400 of reading optical indicia with the imaging scanner in FIG. 3 or other imaging scanner in accordance with some embodiments. The method 400 of capturing an image includes operations 410, 420, 430, 440, and 450. Operation 410 includes generating illumination light with an illumination system. Operation 420 includes initiating a process to capture an image of the optical indicia with an imaging system. Operation 430 includes measuring an intensity of light reflected into a detector system including a photodetector. Operation 440 includes integrating an electrical signal from an output of the photodetector. Operation 450 includes ending the capturing the image after the integration of the electrical signal from the output of the photodetector reaches a predetermined value. In one implementation, operation 450 also includes terminating the illumination light.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of reading optical indicia on a surface of an object comprising:

generating a calibration light from an illumination source with an illumination system for determining an optimum exposure level of an imaging system that takes into account a reflectivity of the surface of the object when a measured intensity of ambient light is lower than a predetermined value;

measuring an intensity of the calibration light reflected into a detector system;
determining the optimum exposure level of the imaging system based on the measured intensity of the calibration light reflected into the detector system;
generating an illumination light from the illumination source with the illumination system; and
capturing an image of the optical indicia with the imaging system subjecting to the optimum exposure level while the optical indicia is illuminated by the illumination light from the illumination source.

2. The method of claim 1, further comprising:
measuring the ambient light with the detector system.

3. The method of claim 1, wherein the generating calibration light comprises:
generating the calibration light with the illumination system.

4. The method of claim 1, wherein the generating calibration light comprises:
generating the calibration light with a calibration illumination system.

5. The method of claim 1, wherein the generating calibration light comprises:
generating the calibration light modulated at a modulation frequency.

6. The method of claim 5, wherein the measuring an intensity of the calibration light comprising:
detecting the reflected calibration light to generate an electrical signal having an amplitude depending upon the intensity of the reflected calibration light from the object of interest being detected; and
passing the generated electrical signal through a band pass filter having a pass band including the modulation frequency.

7. The method of claim 1, wherein the measuring an intensity of the calibration light comprising:
passing the reflected calibration light through an optical filter to incident upon a photodetector.

8. The method of claim 1, wherein the generating an illumination light comprises:
generating a pulsed illumination light having intensity at lest two times larger than the average intensity of the calibration light.

9. The method of claim 1, wherein the determining an optimum exposure level comprises:
determining an optimum exposure time.

10. The method of claim 9, wherein the generating an illumination light comprises:
generate an illumination light with an illumination system during the determined optimum exposure time.

11. A method of reading optical indicia on a surface of an object with comprising:
generating a calibration light from an illumination source with an illumination system for determining an optimum exposure level of an imaging system that takes into account a reflectivity of the surface of the object;
measuring an intensity of the calibration light reflected into a detector system;
determining the optimum exposure level of the imaging system based on the measured intensity of the calibration light reflected into the detector system;
generating an illumination light from the illumination source with the illumination system; and
capturing an image of the optical indicia with the imaging system subjecting to the optimum exposure level while the optical indicia is illuminated by the illumination light from the illumination source.

12. The method of claim 11, wherein the generating calibration light comprises:
generating the calibration light with the illumination system.

13. The method of claim 11, wherein the generating calibration light comprises:
generating the calibration light with a calibration illumination system.

14. The method of claim 11, wherein the generating calibration light comprises:
generating the calibration light modulated at a modulation frequency.

15. The method of claim 14, wherein the measuring an intensity of the calibration light comprising:
detecting the reflected calibration light to generate an electrical signal having an amplitude depending upon the intensity of the reflected calibration light from the object of interest being detected; and
passing the generated electrical signal through a band pass filter having a pass band including the modulation frequency.

16. An imaging scanner for reading an optical indicia comprising:
an illumination system having at least two operation modes, wherein the illumination system in the first operation mode generates a calibration light from an illumination source, and the illumination system in the second operation mode generates an illumination light from the illumination source;
a detector system operable to measure intensity of the calibration light reflected into the detector system; and
an imaging system including an imaging sensor and having a first lens system defining a first field of view, wherein the imaging system is configured to capture an image of the optical indicia with an optimum exposure level that is determined based on the measured intensity of the calibration light reflected into the detector system.

17. The imaging scanner of claim 16, wherein the detector system comprises a second lens system defining a second field of view substantially overlap with the first field of view of the imaging system.

18. The imaging scanner of claim 16, wherein the detector system comprises an optical filter configured to filter light detected by the detector, wherein the optical filter has photo sensitivity spectrum substantially overlaps with the photo sensitivity spectrum of the imaging sensor.

19. The imaging scanner of claim 16, wherein the illumination system in the first operation mode generates a calibration light modulated at a modulation frequency.

20. The imaging scanner of claim 19, wherein the detector system comprises a photodetector having an output coupled to a band pass filter, wherein the band pass filter has a pass band including the modulation frequency.

21. The imaging scanner of claim 16, wherein the illumination system in the second operation mode generates a pulsed illumination light having intensity at least two times larger than the average intensity of the calibration light.

22. The imaging scanner of claim 16, further comprising: a filter for ambient light coupled between the detector system and the imaging system.

23. The imaging scanner of claim 16, further comprising: a filter for calibration light coupled between the detector system and the imaging system.

24. The imaging scanner of claim 16, further comprising: a scan engine chassis having the illumination system, the detector system, and the imaging system mounted thereon.

25. The imaging scanner of claim 24, further comprising: a portable enclosure having the scan engine chassis installed therein.

26. The imaging scanner of claim 24, further comprising: a stationary enclosure having the scan engine chassis installed therein.

27. The imaging scanner of claim 16, further comprising: a portable enclosure having the illumination system, the detector system, and the imaging system installed therein.

28. The imaging scanner of claim 16, further comprising: a stationary enclosure having the illumination system, the detector system, and the imaging system installed therein.

* * * * *